United States Patent

Sugiura

[11] Patent Number: 5,113,266
[45] Date of Patent: May 12, 1992

[54] RUN LENGTH ENCODER

[75] Inventor: Masamichi Sugiura, Osaka, Japan

[73] Assignee: Minolta Camera Kabushiki Kaisha, Osaka, Japan

[21] Appl. No.: 203,984

[22] Filed: Jun. 8, 1988

[30] Foreign Application Priority Data

Jun. 12, 1987 [JP] Japan .............................. 62-147337
Jun. 12, 1987 [JP] Japan .............................. 62-147338

[51] Int. Cl.⁵ .............................................. H04N 1/40
[52] U.S. Cl. ............................. 358/426; 358/261.1; 358/261.2; 358/261.3
[58] Field of Search ............... 358/261.1, 261.2, 262.1, 358/262.3, 426, 427; 341/65, 64, 67

[56] References Cited

U.S. PATENT DOCUMENTS

| | | | |
|---|---|---|---|
| 3,795,765 | 3/1974 | De Groat | 375/17 |
| 3,919,476 | 11/1975 | Torpie | 358/261.1 |
| 4,057,834 | 11/1977 | Nakagome | 358/261.1 |
| 4,092,676 | 5/1978 | Saran | 358/261 |
| 4,229,768 | 10/1980 | Kurahayashi et al. | 358/261.3 |

Primary Examiner—Edward L. Coles, Sr.
Assistant Examiner—Jerome Grant, II
Attorney, Agent, or Firm—Burns, Doane, Swecker & Mathis

[57] ABSTRACT

A run length encoder for compressing binary image data including black and white picture elements of opposite logic levels is disclosed. The encoder provides means for calculating black to white data ratio regarding image data to be compressed and means for reversing each of the logic levels of the binary image data from one to another before encoding them if black data is predominant.

8 Claims, 4 Drawing Sheets

RUN LENGTH ENCODER

BACKGROUND OF THE INVENTION

1. Field of the Invention

The present invention relates to a run length encoder for compressing binary image data and restoring compressed image data.

2. Description of Related Art

A one dimensional encoding method such as modified Hoffman encoding method is widely used for compressing binary image data including black and white picture elements efficiently in the image data processing system such as the facsimile system.

According to the encoding method, an encoding code is assigned to every one dimensional black or white run length. Upon assigning codes, an encoding code having a shorter code length is assigned to a run length having a higher statistical probability of occurrence in a normal document in order to increase the compressing rate of image data. Namely, in a normal document of a white ground, the shortest code is assigned to a run length of two or three unit lengths. This type of encoding is referred to in the present specification and claims as "run length encoding."

However, in the microfilm system, microfilms of negative image type are usually used than those of positive image type. In such a microfilm of negative image type, statistical properties of black and white run lengths are inverted with each other. Accordingly, if an image of negative image type is processed with use of the conventional encoding method, the compression efficiency is rather worsened since long codes are assigned to run lengths each of which occurs at a high probability in the image of negative type.

SUMMARY OF THE INVENTION

Accordingly, an essential object of the present invention is to provide a run length encoder being able to obtain a high efficiency in compressing binary image data not only for an image formed on a white ground but also for an image formed on a black ground.

Another object of the present invention is to provide a run length encoder being able to reverse logic levels of binary image data from black to white or vice versa.

A further object of the present invention is to provide a run length encoder being able to reverse logic levels of binary image data from one to another automatically.

In order to accomplish these objects, according to the present invention, there is provided a run length encoder for compressing binary image data including black and white picture elements of opposite logic levels, said encoder comprising means for reversing each of the logic levels of the binary image data from one to another and means for compressing the binary image data of which the logic levels are reversed by said reversing means.

According to this first invention, each of the opposite logic levels of binary image data obtained from an original such as a microfilm of negative image type is reversed from one to another and, therefore, binary image data can be compressed efficiently.

According to the second present invention, there is provided a run length encoder for compressing binary image data including black and white picture elements of opposite logic levels, said encoder comprising means for detecting whether the number of the black picture elements is larger than the number of the white picture elements in the binary image data to be compressed, means for reversing each of the logic levels of the binary image data from one to another when said detecting means detects that the number of the black picture elements is larger than the number of the white picture elements and means for compressing the binary image data.

In this invention, each of logic levels of the binary image data is reversed if black is predominant in an original.

According to the third present invention, there is provided a run length encoder for compressing binary image data including black and white picture elements of opposite logic levels, said encoder comprising means for selecting a reverse mode if the number of the black picture elements is larger than the number of the white picture elements in the binary image data to be compressed and a non-reverse mode if the number of the white picture elements is larger than the number of the black picture elements in the binary image data to be compressed, means for compressing the binary image data and means for sending the binary image data of which the logic levels are reversed from one to another, respectively, to said compressing means when said selecting means selects the reverse mode and for sending the binary image data to said compressing means without reversing the logic levels of the binary image data when said selecting means selects the non-reverse mode.

In this invention, it is automatically selected in accordance with a predominant color of an original if the logic levels are to be reversed with each other.

According to the present invention, there is further provided a run length encoding and decoding apparatus for compressing binary image data including black and white picture elements of opposite logic levels and restoring the compressed image data to binary image data, said apparatus comprising first reversing means for reversing each of the logic levels of the binary image data to be compressed from one to another, means for compressing the binary image data of which the logic levels are reversed by said first reversing means, means for restoring the compressed image signal to the binary image data and second reversing means for reversing each of the logic levels of the binary image data having been restored by said restoring means from one to another.

According to this invention, the image data compressed after reversing the logic levels are reversed again upon decoding them.

According to the present invention, there is provided a run length encoding and decoding apparatus for compressing binary image data including black and white picture elements of opposite logic levels and restoring the compressed image data to the binary image data, said apparatus comprising means for detecting whether the number of the black picture elements is larger than the number of the white picture elements in the binary image data to be compressed, means for compressing the binary image data, means for sending the binary image data to said compressing means after reversing each of the logic levels from one to another when said detecting means detects that the number of the black picture elements is larger than the number of the white picture elements and for sending the binary image data to said compressing means without reversing the logic levels of the binary image signal when said detecting means detects the number of the white picture elements is larger than the number of the black picture elements, outputting means for outputting the compressed image data with an attribute information which indicates a result of the detection of said detecting means, means for restoring the compressed image data to the binary image data and means for reversing each of the logic levels of the image data which are restored by said restoring means from one to another if it is indicated by the attribute information that the number of black picture elements is larger than that of white picture elements.

In this invention, it is automatically decided whether or not the logic levels of binary image data are to be reversed with each other and, if they have been reversed before compressing, they are automatically reversed again upon decoding the compressed image data.

BRIEF DESCRIPTION OF DRAWINGS

These and other objects and features of the present invention will become more apparent when the preferred embodiment of the present invention is described in detail with reference of accompanied drawings in that.

DESCRIPTION OF THE PREFERRED EMBODIMENT

Figure 1:
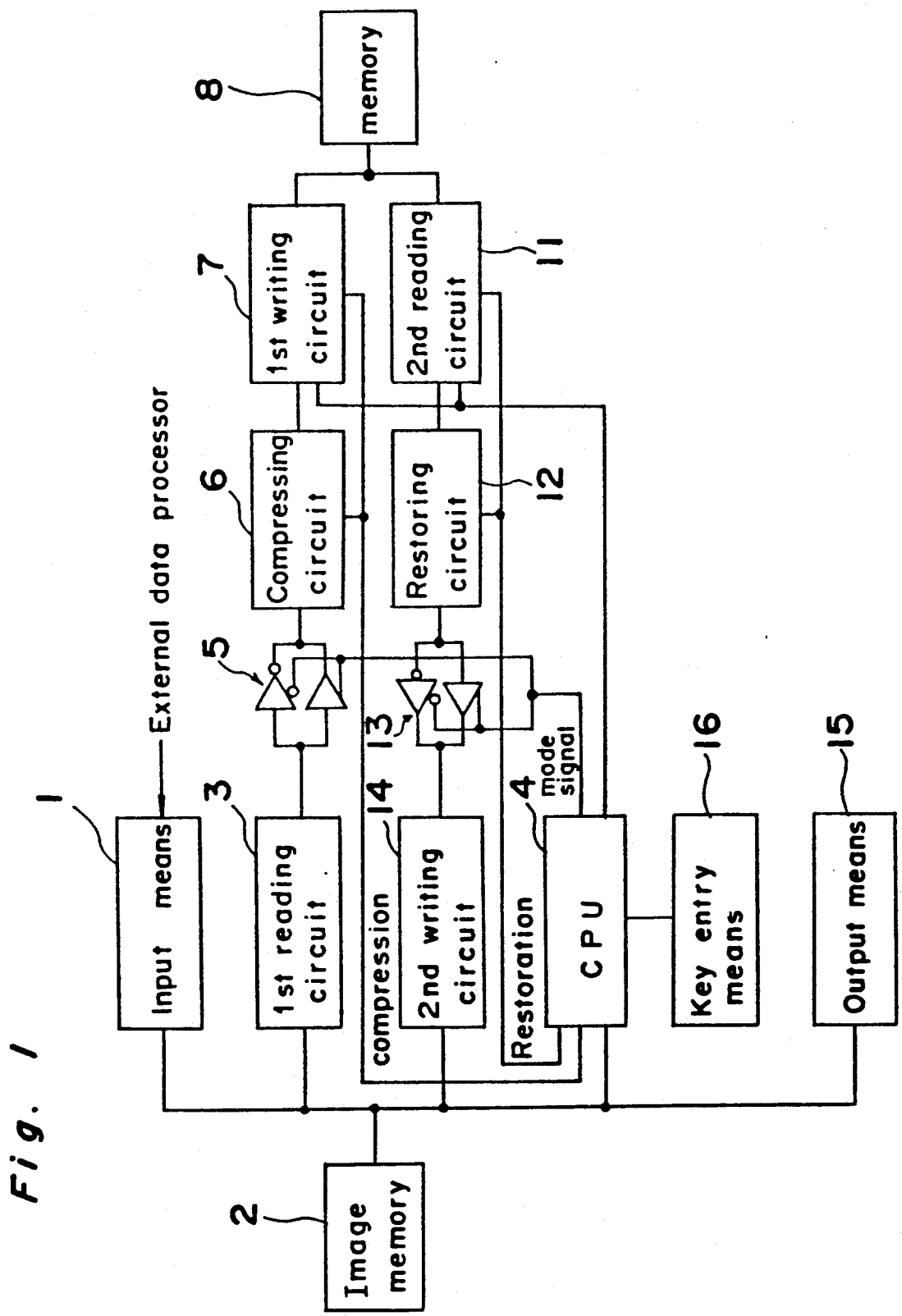
FIG. 1 is a block diagram of a run length encoding and decoding apparatus according to the present invention.

FIG. 1 shows a block diagram of an encoding and decoding apparatus according to the present invention.

An input means 1 accesses binary image data including black and white picture elements of opposite logic levels which are input from an external data processor and transmits them to an image memory 2 to store them therein. The image memory 2 is a random access memory (RAM) having a memory area for storing at least binary image data of one side of a document.

Upon compressing the binary image data, first reading circuit 3, when received a compression request signal from CPU 4, reads out the binary image data stored in the image memory 2 and sends them to first reverse circuit 5. The first reverse circuit 5 is comprised of a pair of three states buffer and an inverter and reverses each of the logic levels of the binary image data sent from the first reading circuit 3 or outputs them without reversing them according to the level of a mode signal sent from CPU 4.

A compression circuit 6 connected to the output of the first reverse circuit 5 includes an LSI for encoding binary image data according to the modified Hoffman encoding method and, thereby, encodes the binary image data outputted from the first reverse circuit 5. First writing circuit 7 writes the binary image data encoded by the compression circuit 7 into memory apparatus 8. The memory apparatus 8 is comprised of a filing apparatus having a non-volatile memory of large volume such as a photo-disk apparatus and memorizes not only the encoded binary image data but also file managing information including attribute information regarding them which will be explained later.

Upon restoring the compressed binary data, second reading circuit 11, when receives a restoration request signal from CPU 4, reads out them from the memory apparatus 8 and send the encoded data to restoring circuit 12 or CPU 4. The restoring circuit 12 includes an LSI for decoding them and, thereby, decodes the encoded binary image data. The decoded binary image data are sent to second reversing circuit 13. The second reversing circuit 13 is comprised of a pair of 3-states buffer and an inverter and reverses the restored data from the second reading circuit 11 or outputs without reversing them according to a mode signal outputted from CPU 4. Second writing circuit 14 writes the restored binary image data from the second reversing circuit 13 into the image memory 2.

The restored binary image data written into the image memory 2 are outputted, via output means 15, to an output apparatus such as a printer, a CRT or the like.

CPU 4 controls circuits 3, 5 to 7 provided for compressing the binary image data and circuits 11 to 14 for restoring the compressed data.

A key entry means 16 such as a key board is connected to CPU 4 in order to enter commands regarding compression and/or restoration of the binary image data. AUTOMATIC, REVERSE and NORMAL registration commands are prepared as commands for compressing binary image data. If the AUTOMATIC registration command is entered, ratio of data having black logic level (black data) to data having white logic level (white data) is automatically calculated with respect to the binary image data to be compressed. If the black data is predominant, the binary image data are reversed in regard to the logic level and, then the reversed binary image data are encoded. This calculation of the black to white data ratio is done by CPU 4. Namely, CPU 4 reads the binary image data out of the image memory 2, counts respective numbers of black and white data included in them and decides a predominant logic level as the result of comparison of the counted numbers.

The reverse registration command is used for encoding the binary image data after reversing each of the logic levels of black and white data. Further, the normal registration command is used for encoding the binary image data without reversing.

If the AUTOMATIC registration mode is not intended, the first reverse circuit 5 can be inserted between the input means 1 and the image memory 2.

Further, if the calculation of the black to white data ratio is intended to be done by the external data processor, the result thereof is input to the first and second reverse circuits 5 and 13 and according thereto, it is decided whether or not the binary image data should be reversed.

Figure 2:
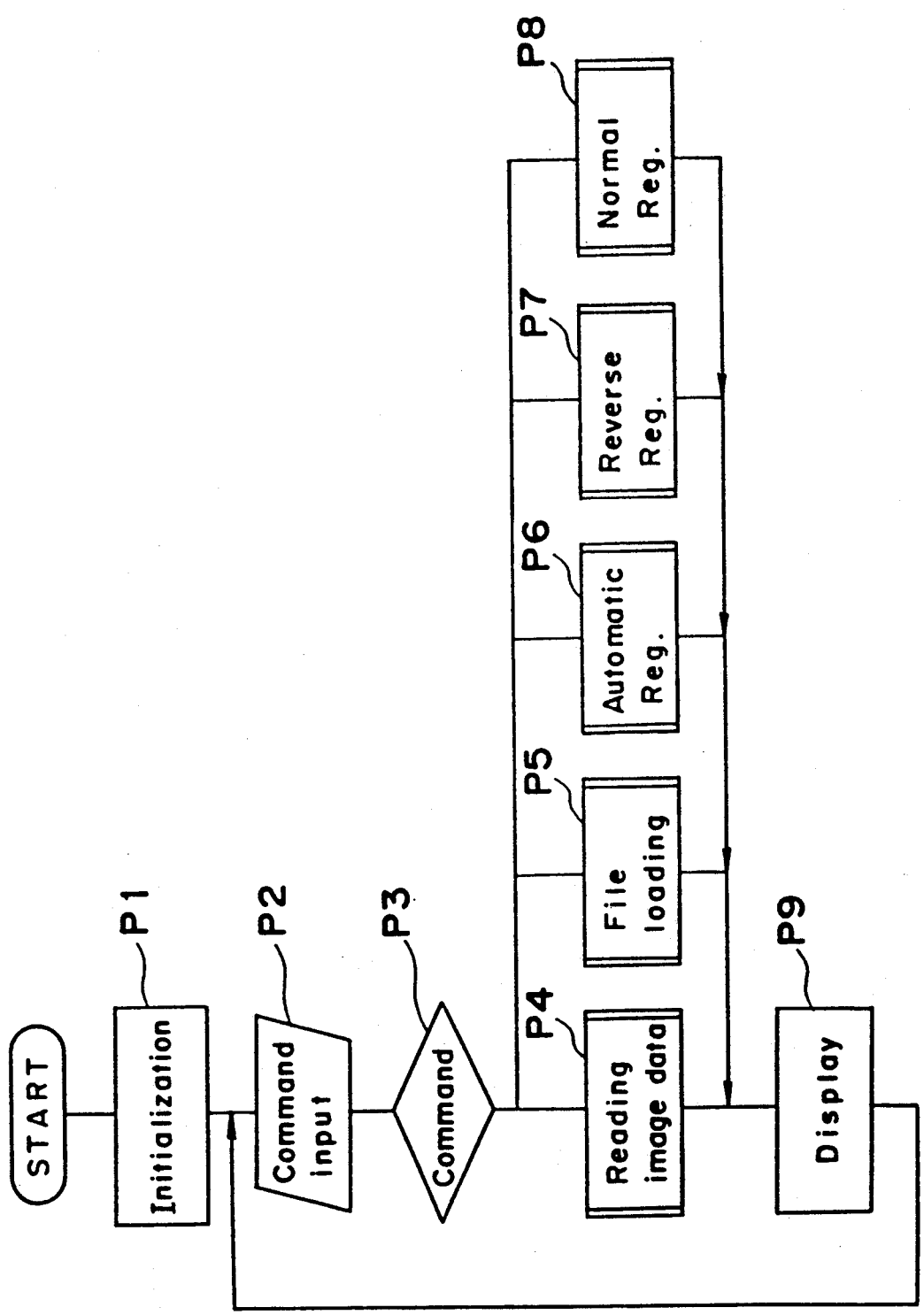
FIG. 2 is a flow chart of the main routine to be executed by the run length encoding and decoding apparatus according to the present invention.

FIG. 2 shows a flow chart of the main routine to be executed by CPU 4.

When the main routine is started, the system is initialized at step P1. Then, the key entry means 16 is operated at step P2 in order to enter a command. At step P3, the entered command is identified.

If the entered command is a command for requesting to read into image data, the binary image data sent from the external data processor are written into the image memory 2 through the access means 1 at step P4.

If it is the AUTOMATIC registration command, the binary image data are compressed after reversing or without reversing in accordance with the obtained black to white data ratio and the compressed image data are registered into the memory apparatus 8 as a file at step P6.

If it is the REVERSE registration command, the binary image data are reversed at first, then compressed and registered into the memory apparatus 8 as a file at step P7.

If it is the NORMAL registration command, the binary image data are compressed without reversing them and registered into the memory apparatus 8 as a file at step P8.

After either one of subroutines from P4 to P8 has been executed, the image data stored in the image memory are displayed by CRT (not shown) as an external output apparatus at step P9. Thereafter, the process returns to step P2 in order to process the next command.

Figure 3:
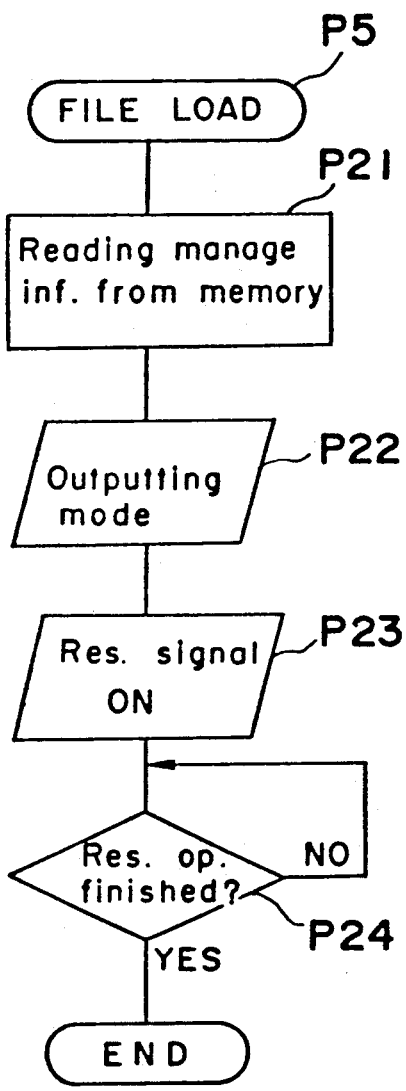
FIG. 3 is a flow chart of the FILE LOADING subroutine shown in FIG. 2.

FIG. 3 shows a flow chart of the file load subroutine P5.

At first, the managing information registered in the memory apparatus 8 is read out through the second reading circuit 11 at step P21.

Next a mode signal indicating attribute information included in the managing information is outputted to the second reverse circuit 13 at step P22. The attribute information is defined as information indicating whether or not the image data stored in the memory apparatus 8 have been reversed before encoding them. The attribute information is determined according to the calculated black to white data ratio and is added just before the binary image data upon writing them into the memory apparatus 8. Next, the restoration request signal is set at "high" level at step P23. Due to this signal, the restoring circuit 12 begins the restoration operation. The restored image data are outputted, through the second reverse circuit 13, to the second writing circuit 14 and the latter writes them into the image memory 2. If all of the image data of one page have been restored, the file load subroutine is completed at step P24.

Figure 4:
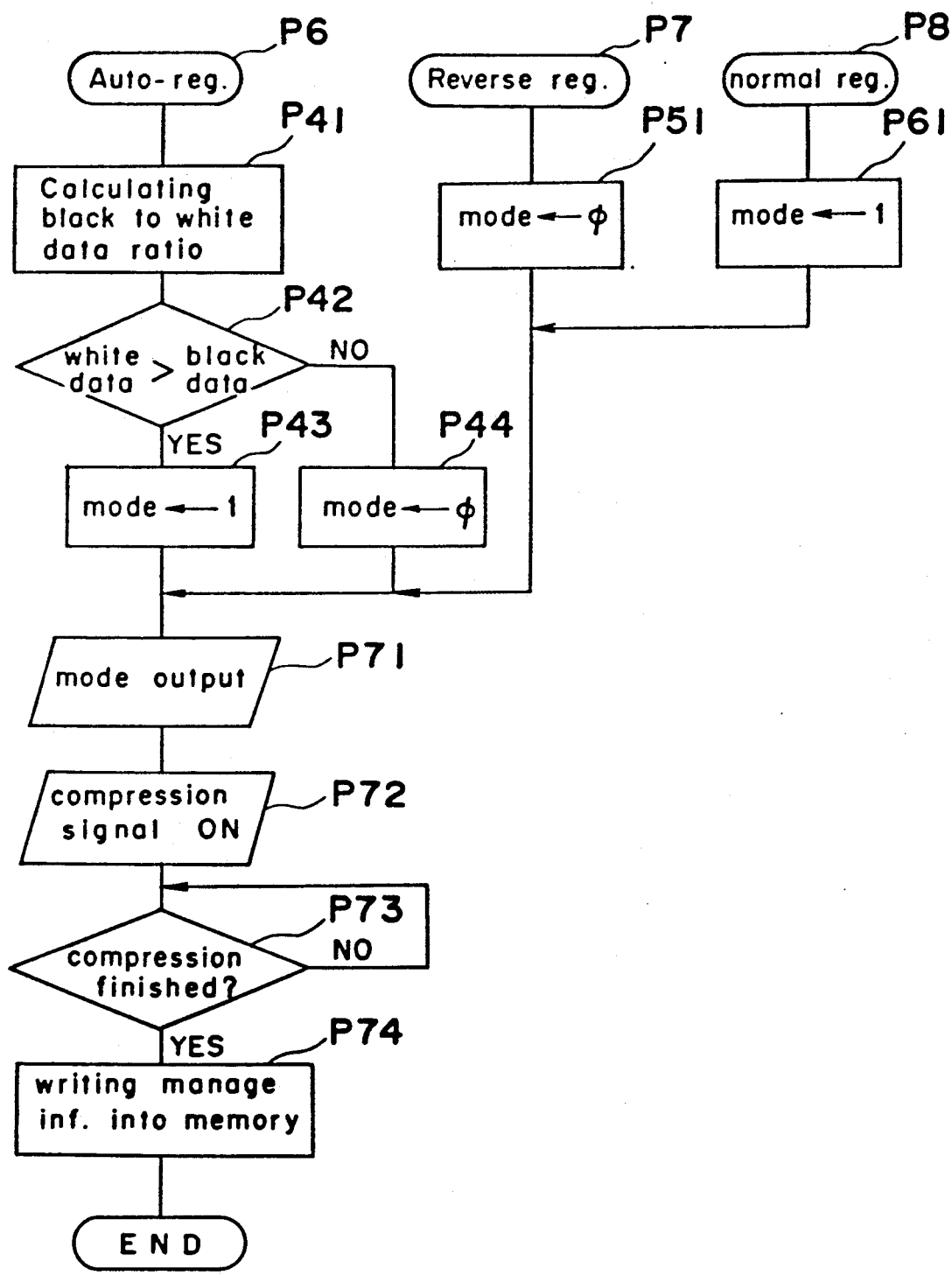
FIG. 4 is a flow chart for AUTOMATIC, REVERSE and NORMAL registration subroutines shown in FIG. 2.

FIG. 4 shows a flow chart including the automatic, reverse and normal registration subroutines from step P6 to step P8.

In the automatic registration mode, the black to white data ratio is calculated with respect to the image data stored in the image memory 2 at step P41. If it is decided at step P41 that the white data is predominant compared to the black data, the mode signal is set at "1" (normal) at step P43.

On the other hand, if the black data is predominant compared to the white data, the mode signal is set at "0" (reverse) at step P44.

If the reverse registration mode is designated, the mode signal is set at "0" (reverse) at step P51.

If the normal registration mode is designated, the mode signal is set at "1" (normal) at step P61.

The mode signal thus set is applied to the first reverse circuit 5 at step P71. Then, the compression request signal is set at "high" level at step P72 and, therefore, the compressing circuit 6 starts its encoding operation. When the compressing of all data of one page is completed at step P73, the compressed image data are written into the memory apparatus 8 together with the managing information including the attribute information at step P74.

Figure 5:
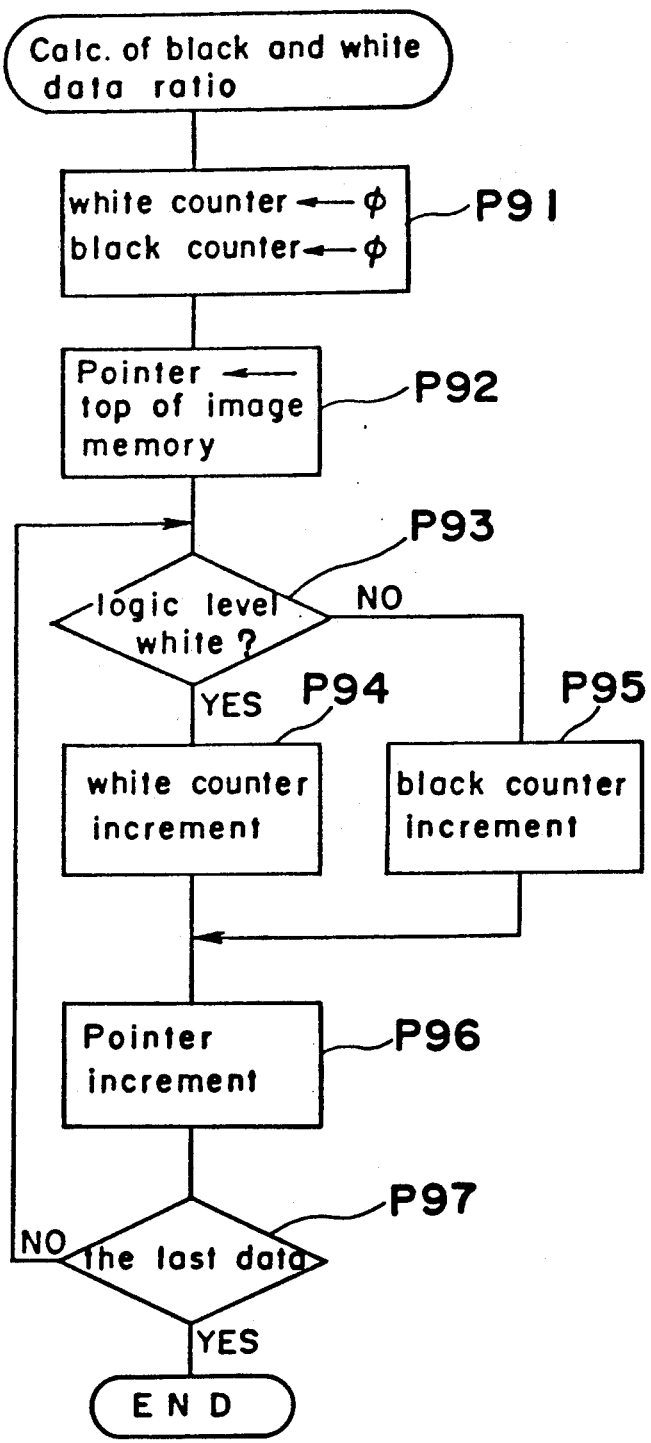
FIG. 5 is a flow chart of the subroutine for calculating ratio of black data to white data shown in FIG. 4.

The calculation of the black and white data ratio is carried out according to a flow chart shown in FIG. 5.

At step P91, internal black and white counters provided for counting respective numbers of black and white data are reset at "0", respectively. Next, a pointer for reading image data stored in the image memory 2 is set at the top address of the image memory 2 at step P92. Then, the first data of the image memory 2 designated by the reading pointer is read out to decide whether its logic level indicates white or not at step P93. If it is white, the white counter is incremented by one at step P94. If it is not white, namely if it is black, the black counter is incremented by one at step P95. Then, the reading pointer is renewed for the next data at step P96.

The count operation is continued until the reading pointer points to the last data of the image memory 2. Thus, respective numbers of black and white data in the image memory 2 are counted and the obtained numbers are memorized in a RAM of CPU 4. They are utilized in the AUTOMATIC registration mode to decide whether the reversing operation should be done or not.

As is clear from the detailed description of the preferred embodiment of the present invention, the efficiency in compression of image data is improved since the encoding operation is carried out in regard to the image data which give a higher compression efficiency as a whole.

Also, in the preferred embodiment, since the reversed image data are reversed again in the AUTOMATIC registration mode before outputting them, no operator worry about the reversed image.

Although the black to white data ratio is calculated with respect to all data of every page in the preferred embodiment, it can be done with respect to every line.

The preferred embodiments described herein are illustrative and not restrictive, the scope of the invention being indicated by the appended claims and all variations which come within the meanings of the claims are intended to be embraced herein.

What is claimed is:

1. A run length encoder for compressing binary image data including black and white picture elements of opposite logic levels, said encoder comprising:
   means for detecting whether the number of the black picture elements is larger than the number of the white picture elements in the binary image data to be compressed;
   means for reversing each of the logic levels of the binary image data from one to another when said detecting means detects that the number of the black picture elements is larger than the number of the white picture elements; and
   means for compressing the binary image data.

2. A run length encoder as claimed in claim 1, further comprising means for outputting the compressed image data with an attribute information which indicates a result of the detection of said detecting means.

3. A run length encoder for compressing binary image data including black and white picture elements of opposite logic levels, said encoder comprising:
   means for selecting a reverse mode if the number of the black picture elements is larger than the number of the white picture elements in the binary image data to be compressed and a non-reverse mode if the number of the white picture elements is larger than the number of the white picture elements in the binary image data to be compressed;
   means for compressing the binary image data; and means for sending the binary image data of which each of the logic levels are reversed from one to another, respectively, to said compressing means when said selecting means selects the reverse mode, and for sending the binary image data to said compressing means without reversing the logic levels of the binary image data when said selecting means selects the non-reverse mode.

4. A run length encoder as claimed in claim 3 wherein said selecting means includes means for respectively counting the numbers of the black and white picture elements.

5. A run length encoder as claimed in claim 3 wherein said selecting means includes key input means which is manually operable.

6. A run length encoding process for compressing binary image data including black and white picture elements of opposite logic levels, said encoding process comprising steps of:
 (a) detecting whether the number of the black picture elements is larger than that of the white picture elements in the binary image data to be compressed;
 (b) reversing each of the logic levels of the binary image data from one to another when it is detected at step (a) that the number of the black picture elements is larger than the number of the white picture elements; and
 (c) compressing the binary image data of which the logic levels are reversed at said reversing step.

7. A run length encoding and decoding apparatus for compressing binary image data including black and white picture elements of opposite logic levels and restoring the compressed image data to the binary image data, said apparatus comprising:
 means for detecting whether the number of the black picture elements is larger than the number of the white picture elements in the binary image data to be compressed;
 means for compressing the binary image data;
 means for sending the binary image data;
 means for sending the binary image data to said compressing means after reversing each of the logic levels from one to another when said detecting means detects that the number of the black picture elements is larger than the number of the white picture elements and for sending the binary image data to said compressing means without reversing the logic levels of the binary image data when said detecting means detects the number of the white picture elements is larger than the number of the black picture elements;
 outputting means for outputting the compressed image signal with an attribute information which indicates a result of the detection of said detecting means;
 means for restoring the compressed image data to the binary image data; and
 means for reversing each of the logic levels of the image data which are restored by said restoring means from one to another if it is indicated by the attribute information that the number of black picture elements is larger than that of white picture elements.

8. A run length encoder for compressing binary image data including black and white picture elements of opposite logic levels, said encoder comprising:
 means for detecting whether the number of the black picture elements is larger than the number of the white picture elements in the binary image data to be compressed;
 means for reversing every logic level of the successive binary image data from one another when said detecting means detects that the number of the black picture elements is larger than the number of the white picture elements; and
 means for compressing using run length encoding the binary image data.

* * * * *